United States Patent
Sato et al.

(10) Patent No.: US 7,498,364 B2
(45) Date of Patent: Mar. 3, 2009

(54) INK COMPOSITION COMPRISING A BLOCK OR GRAFT POLYMER AND AT LEAST ONE COLORANT

(75) Inventors: Koichi Sato, Atsugi (JP); Ikuo Nakazawa, Zama (JP); Sakae Suda, Sagamihara (JP); Ryuji Higashi, Atsugi (JP); Masayuki Ikegami, Atsugi (JP); Keiichiro Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 10/555,237

(22) PCT Filed: Aug. 4, 2004

(86) PCT No.: PCT/JP2004/011526

§ 371 (c)(1),
(2), (4) Date: Nov. 1, 2005

(87) PCT Pub. No.: WO2005/012444

PCT Pub. Date: Feb. 10, 2005

(65) Prior Publication Data

US 2007/0015856 A1  Jan. 18, 2007

(30) Foreign Application Priority Data

Aug. 5, 2003  (JP) .............. 2003-286926
Jul. 23, 2004  (JP) .............. 2004-216363

(51) Int. Cl.
*C08K 9/10* (2006.01)

(52) U.S. Cl. .............. 523/210; 523/205; 523/211; 523/160; 523/161; 524/80

(58) Field of Classification Search ............... 524/80; 523/160, 161
See application file for complete search history.

(56) References Cited

U.S. PATENT DOCUMENTS 4,692,188 A * 9/1987 Ober et al. .............. 523/300
5,085,698 A   2/1992 Ma et al. ................ 106/20

(Continued)

FOREIGN PATENT DOCUMENTS

EP  1 184 427 A2  3/2002

(Continued)

OTHER PUBLICATIONS

Gulari, et al., "Photon Correlation Spectroscopy of Particle Distributors", *J. Chem. Phys.*, vol. 70, No. 18 (1979), pp. 3965-3972.

(Continued)

*Primary Examiner*—David Wu
*Assistant Examiner*—Vu Nguyen
(74) *Attorney, Agent, or Firm*—Fitzpatrick, Cella, Harper & Scinto

(57) ABSTRACT

A functional-substance-including structured material having good dispersion stability, and an ink composition, which inhibits aggregation by interaction between particles, and has stable dispersibility in a solvent and good coloring ability and fixing ability. The functional-substance-including structured material comprises a plurality of functional substances different from each other physically included in a block polymer or graft polymer. The ink composition comprises the functional-substance-including structured material, and a solvent or dispersing medium.

5 Claims, 2 Drawing Sheets

U.S. PATENT DOCUMENTS

| | | | | |
|---|---|---|---|---|
| 7,004,579 | B2 | 2/2006 | Sato et al. | 347/105 |
| 7,056,972 | B2 | 6/2006 | Nakazawa et al. | 524/505 |
| 7,067,590 | B2 | 6/2006 | Sato et al. | 525/299 |
| 2002/0186288 | A1* | 12/2002 | Nakazawa et al. | 347/100 |
| 2003/0027894 | A1* | 2/2003 | Sato et al. | 523/160 |
| 2005/0131102 | A1 | 6/2005 | Nakazawa et al. | 523/160 |
| 2005/0140762 | A1 | 6/2005 | Sato et al. | 347/100 |
| 2005/0197424 | A1 | 9/2005 | Higashi et al. | 523/160 |
| 2005/0209367 | A1 | 9/2005 | Sato et al. | 523/161 |
| 2005/0219277 | A1 | 10/2005 | Sato et al. | 347/1 |
| 2005/0239918 | A1 | 10/2005 | Nakazawa et al. | 523/160 |
| 2005/0249925 | A1 | 11/2005 | Ikegami et al. | 428/195.1 |
| 2006/0004124 | A1 | 1/2006 | Tsubaki et al. | 523/160 |
| 2006/0047015 | A1 | 3/2006 | Duda et al. | 523/160 |
| 2006/0050117 | A1 | 3/2006 | Sato et al. | 347/100 |
| 2006/0057485 | A1 | 3/2006 | Teshima et al. | 430/108.8 |
| 2006/0100310 | A1 | 5/2006 | Nakazawa et al. | 523/160 |
| 2006/0128828 | A1 | 6/2006 | Sato et al. | 523/160 |
| 2006/0144287 | A1 | 7/2006 | Tsubaki et al. | 106/31.13 |
| 2006/0146087 | A1 | 7/2006 | Sato et al. | 347/21 |
| 2006/0148997 | A1 | 7/2006 | Sato et al. | 525/299 |
| 2006/0160975 | A1 | 7/2006 | Suda et al. | 526/330 |
| 2006/0178468 | A1 | 8/2006 | Sato et al. | 524/556 |
| 2006/0221117 | A1 | 10/2006 | Sato et al. | 347/21 |
| 2006/0235177 | A1 | 10/2006 | Ikegami et al. | 526/287 |
| 2006/0250463 | A1 | 11/2006 | Nakazawa et al. | 347/100 |
| 2006/0281853 | A1 | 12/2006 | Yamagishi et al. | 524/547 |

FOREIGN PATENT DOCUMENTS

| | | |
|---|---|---|
| EP | 1 243 624 A1 | 9/2002 |
| EP | 1 285 948 A2 | 2/2003 |
| JP | 11-322942 | 11/1999 |
| WO | WO 2004/005362 A2 | 1/2004 |

OTHER PUBLICATIONS

Annalen der Physik, vol. 25 (1908), pp. 377-445.

Aoshima, et al., "Living Cationic Polymerization of Vinyl Monomers by Organoaluminium Halides", Journal of Polymer Bulletin, vol. 15 (1986), No. 5, pp. 417-423.

Annalen der Physik, vol. 25 (1908), pp. 377-417.

* cited by examiner

INK COMPOSITION COMPRISING A BLOCK OR GRAFT POLYMER AND AT LEAST ONE COLORANT

BACKGROUND OF THE INVENTION

1. Field of the Invention

The present invention relates to a functional substance including structured material containing a polymer, which can be used as various functional materials, a functional substance dispersed composition containing the structured material, and a liquid-applying process and apparatus for applying the composition.

2. Related Background Art

As for dispersed materials containing a functional substance, there have heretofore been well known agricultural chemicals such as herbicides and insecticides, medicaments such as anti-cancer drugs, anti-allergic drugs and antiphlogistics, and coloring materials containing a colorant as particulate solids, such as inks and toners. In recent years, among these, digital printing technology utilizing a composition containing a coloring material has been vigorously developed. Typical examples of this digital printing technology include those called electrophotographic technology and ink-jet technology, and its importance as image-forming technology in homes and offices has increased more and more in recent years.

Among these, the ink-jet technology has a great feature as a direct recording method in that it is compact and low in consumption power. The formation of high-quality images is also quickly advanced by formation of micro-nozzles or the like. An example of the ink-jet technology includes a method that an ink fed from an ink tank is evaporated and bubbled by heating it by a heater in a nozzle, thereby ejecting the ink to form an image on a recording medium. Another example includes a method that an ink is ejected from a nozzle by vibrating a piezoelectric element.

In order to improve weathering resistance and fixing ability, it is investigated to use pigment-dispersed inks as inks for ink-jet. U.S. Pat. No. 5,085,698 has proposed a method that a pigment is dispersed by an ionic block polymer having at least one hydrophilic component and at least one hydrophobic component. However, a further improvement is desired in point of inhibiting aggregation by interaction between particles to stably disperse the pigment in a solvent over a long period of time and from the viewpoints of tint, coloring ability and fixing ability.

SUMMARY OF THE INVENTION

The present invention has been completed in view of such problems in the background art, and has as its object the provision of a functional substance including structured material having good dispersion stability with a plurality of different functional substances included in a polymer.

Another object of the present invention is to provide a functional substance dispersed composition, and in particular, an ink composition comprising the structured material and a solvent, which inhibits aggregation by interaction between particles, and has stable dispersibility in the solvent and good coloring ability and fixing ability.

The above objects can be achieved by the present invention described below.

In a first aspect of the present invention, there is thus provided a functional substance including structured material comprising a plurality of functional substances different from each other physically included in a block polymer or graft polymer.

The plurality of the functional materials may preferably be included in a micelle formed by the block polymer or graft polymer.

In a second aspect of the present invention, there is also provided a functional substance dispersed composition comprising the functional substance including structured material, and a solvent or dispersing medium.

In a third aspect of the present invention, there is further provided a liquid-applying process comprising the step of applying the functional substance dispersed composition to a medium.

In a fourth aspect of the present invention, there is still further provided a liquid-applying apparatus comprising a liquid-applying means for applying the composition by causing energy for application to act on the functional substance dispersed composition, and a driving means for driving the liquid-applying means.

According to the present invention, there can be provided a functional substance including structured material having good dispersion stability in which a plurality of functional substances different from each other are included in a polymer.

According to the present invention, there can also be provided a functional substance dispersed composition, in particular, an ink composition comprising the structured material and a solvent, which inhibits aggregation by interaction between particles, and has stable dispersibility in the solvent and good coloring ability and fixing ability.

According to the present invention, there can further be provided a liquid-applying process and apparatus, by which the composition can be stably ejected.

DETAILED DESCRIPTION OF THE PREFERRED EMBODIMENTS

Figure 1:
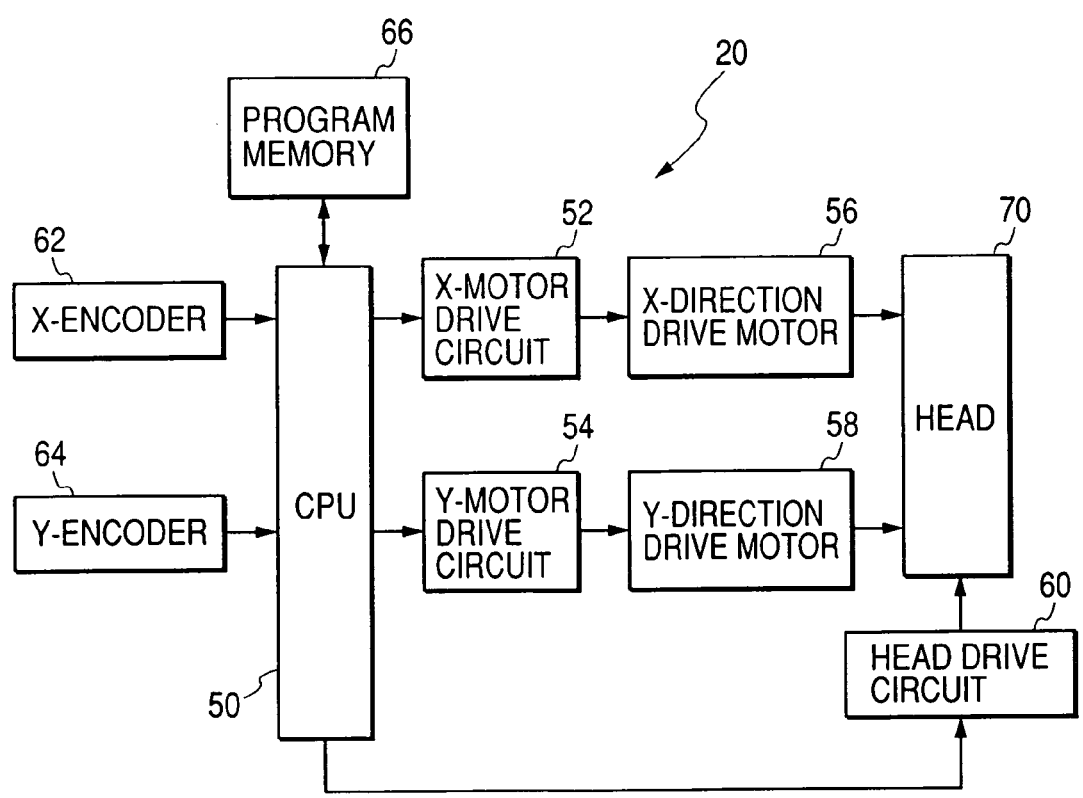
FIG. 1 schematically illustrates the mechanism of an ink-jet recording apparatus according to the present invention.

The present invention will hereinafter be described in detail.

In the first aspect of the present invention, there is provided a functional substance including structured material (hereinafter referred to as "structured material" merely) comprising a plurality of functional substances different from each other included in a block polymer or graft polymer.

The term "functional substance" as used in the present invention means a compound or composition exhibiting a desired function. As examples thereof, may be mentioned agricultural chemicals such as herbicides and insecticides, medicaments such as anti-cancer drugs, anti-allergic drugs and antiphlogistics, and coloring materials, typically, dyes and pigments. Examples of the agricultural chemicals include active compounds having a herbicidal effect and active compounds having an insecticidal effect. Examples of the medicaments include compounds which ease or remit an objective condition. Examples of the coloring materials used include particulate solids such as pigments, and dye compounds.

In the present invention, the coloring materials are preferably used as the functional substances. As described above, examples of the coloring materials include pigments.

Examples of the pigments include inorganic achromatic pigments and organic or inorganic chromatic pigments. Colorless or light-colored pigments and metalescent pigments may also be used. In the present invention, newly synthesized pigments may also be used.

Examples of commercially available pigments of black, cyan, magenta and yellow are mentioned below.

As examples of black pigments, there may be mentioned Raven 1060 (trade name, product of Columbian Carbon Co.), MOGUL-L (trade name, product of Cabot Company), Color Black FW1 (trade name, product of Degussa AG) and MA100 (trade name, product of Mitsubishi Chemical Corporation). However, the present invention is not limited thereto.

As examples of cyan pigments, there may be mentioned C.I. Pigment Blue-15:3, C.I. Pigment Blue-15:4 and C.I. Pigment Blue-16. However, the present invention is not limited thereto.

As examples of magenta pigments, there may be mentioned C.I. Pigment Red-122, C.I. Pigment Red-123 and C.I. Pigment Red-146. However, the present invention is not limited thereto.

As examples of magenta pigments, there may be mentioned C.I. Pigment Red-122, C.I. Pigment Red-123 and C.I. Pigment Red-146. However, the present invention is not limited thereto.

As examples of yellow pigments, there may be mentioned C.I. Pigment Yellow-74, C.I. Pigment Yellow-128 and C.I. Pigment Yellow-129. However, the present invention is not limited thereto.

The dyes used in the present invention may be either publicly known or novel, and such water-soluble dyes such as direct dyes, acid dyes, basic dyes, reactive dyes and food dyes, fat-soluble (oil-soluble) dyes, and insoluble colorants such as disperse dyes as described below may be used. These dyes may also be used in a solid state. Regarding this, for example, oil-soluble dyes are preferably used.

Examples of the water-soluble dyes include direct dyes such as C.I. Direct Black 17, 62 and 154; C.I. Direct Yellow 12, 87 and 142; C.I. Direct Red 1, 62 and 243; C.I. Direct Blue 6, 78 and 199; C.I. Direct Orange 34 and 60; C.I. Direct Violet 47 and 48; C.I. Direct Brown 109; and C.I. Direct Green 59, acid dyes such as C.I. Acid Black 2, 52 and 208; C.I. Acid Yellow 11, 29 and 71; C.I. Acid Red 1, 52 and 317; C.I. Acid Blue 9, 93 and 254; C.I. Acid Orange 7 and 19; and C.I. Acid Violet 49, reactive dyes such as C.I. Reactive Black 1, 23 and 39; C.I. Reactive Yellow 2, 77 and 163; C.I. Reactive Red 3, 111 and 221; C.I. Reactive Blue 2, 101 and 217; C.I. Reactive Orange 5, 74 and 99; C.I. Reactive Violet 1, 24 and 38; C.I. Reactive Green 5, 15 and 23; and C.I. Reactive Brown 2, 18 and 33, and C.I. Basic Black 2; C.I. Basic Red 1, 12 and 27; C.I. Basic Blue 1 and 24; C.I. Basic Violet 7, 14 and 27; and C.I. Food Black 1 and 2.

As examples of the oil-soluble dyes, there are mentioned the following commercially available products of various colors.

As examples of oil-soluble dyes of black, there may be mentioned C.I. Solvent Black 3, 22:1 and 50. However, the present invention is not limited thereto.

As examples of oil-soluble dyes of yellow, there may be mentioned C.I. Solvent Yellow 1, 25:1 and 172. However, the present invention is not limited thereto.

As examples of oil-soluble dyes of orange, there may be mentioned C.I. Solvent Orange 1, 40:1 and 99. However, the present invention is not limited thereto.

As examples of oil-soluble dyes of red, there may be mentioned C.I. Solvent Red 1, 111 and 229. However, the present invention is not limited thereto.

As examples of oil-soluble dyes of violet, there may be mentioned C.I. Solvent Violet 2, 11 and 47. However, the present invention is not limited thereto.

As examples of oil-soluble dyes of blue, there may be mentioned C.I. Solvent Blue 2, 43 and 134. However, the present invention is not limited thereto.

As examples of oil-soluble dyes of green, there may be mentioned C.I. Solvent Green 1, 20 and 33. However, the present invention is not limited thereto.

As examples of oil-soluble dyes of brown, there may be mentioned C.I. Solvent Brown 1, 12 and 58. However, the present invention is not limited thereto.

The examples of the coloring materials mentioned above are particularly preferred in the structured material according to the present invention. However, the coloring materials used in the present invention are not limited to the coloring materials mentioned above.

In the structured material according to the present invention, a plurality of functional substances characteristically different from each other are used as the functional substances. The term "plurality of different functional substances" means a plurality of functional substances except the case where one functional substance of the same type is used, for example, a combined use of at least two functional substances of the same or different types. For example, in the case where a plurality of substances of the same or different types are coloring materials, a combination of an oil-soluble dye A and another oil-soluble dye B, and a combination of a pigment C and a dye D may be mentioned as functional substances of the same type and as functional substances of different types, respectively.

As a feature of the present invention, the plurality of the functional substances are physically included in a block polymer or graft polymer. A preferred form of such inclusion in the block polymer or graft polymer is a form on inclusion in micelles formed by such a polymer. The inclusion of the plurality of the functional substances, preferably coloring materials, in the polymer permits stabilizing the dispersibility and functionality of the respective functional substances different in nature. A preferred embodiment of the present invention includes a structured material, in which a plurality of coloring materials are included. The use of the plurality of the coloring materials permits controlling tint while realizing excellent dispersion stability. The composition according to the present invention that is physically included is very preferred in that the plurality of the functional substances can be simply subjected to a dispersing and including treatment as described below. In some cases, the functional substances or the functional substance and the polymer may be in a state chemically bonded to each other. However, this requires to form a chemical bond of these substances, and so it can be said that the present invention is a superb method in productivity from the industrial point of view.

As described above, the oil-soluble dyes may be used in the present invention. In this case, the dispersion stability can be more improved by causing the plurality of the coloring materials to coexist, which is the feature of the present invention. Combinations of an oil-soluble dye and a pigment, and an oil-soluble dye and another oil-soluble dye are preferably considered. In the case of coloring materials of the same hue, such a combination may be mentioned as a preferred embodiment in that dispersion stability is improved, and color characteristics can be more precisely controlled. In the case of coloring materials of different hues, color expression of other special color systems than fundamental three colors of a primary or complementary color system is allowed. In addition, it can be realized to permit a variety of developments of the color expression without sacrificing the dispersion stability, in the form improved on the contrary. A preferred embodiment that can exhibit these features or merits may include a combination of a pigment and an oil-soluble dye This is a combination of a pigment and an oil-soluble dye of the same hue or different hues that dispersion stability can be improved, color characteristics can be more precisely controlled, and a variety of developments of color expression can be realized without sacrificing the dispersion stability, rather in the form which can improve the dispersion stability. In the present invention, as a preferred process of including these coloring material, may be used a process of dispersing or dissolving coloring materials in an organic solvent, mixing the dispersion or solution with a polymer dissolved likewise and inverting the resultant mixture into a water phase. At this time, the use of the combination of the pigment and the oil-soluble dye can exhibit such a new merit that the dispersibility of the pigment that cannot sufficiently be included nor dispersed can be improved by the use of the oil-soluble dye in combination. The present invention can be said to be industrially very useful in this sense. The oil-soluble dyes in the present invention mean dyes soluble in an organic solvent and are called fat-soluble dyes.

From the viewpoint of such inclusion of the plurality of the coloring materials, an amphiphilic polymer which forms a block polymer or graft polymer develops a good included state, i.e., good dispersion stability because it has stable polymer micelle-forming ability. The stability of the dispersed state is ensured by the presence of the plural kinds of coloring materials in the polymer. For example, when a single type of coloring material is used, crystals tend to grow in a micelle core when the coloring material is an oil-soluble dye in particular, and so the dispersion stability may be impaired in some cases. The use of plural kinds of coloring materials permits successfully inhibiting such crystal growth and developing well the effects described above. According to the present invention, coloring materials, which have heretofore been unable to be used due to their poor dispersion stability though they have good properties, can be made useful by including them together with other coloring materials in the block polymer or graft polymer. As the polymer, a block polymer is preferred in that uniform micelles can be formed.

As the block polymer or graft polymer used, a polymer containing a polyvinyl ether unit structure and having a low glass transition temperature and high molecular mobility is very preferred from the viewpoint of ensuring the above-described dispersion stability.

A polyvinyl ether polymer obtained by a cationic living polymerization process is preferably used in that more stable polymer micelle can be formed from the viewpoint of a precise control of molecular weight as well as molecular weight distribution.

The total content of the plural kinds of functional substances contained in the structured material according to the present invention is preferably from 0.01% by weight to 80%. by weight based on the total weight of the structured material. When the content of the functional substances falls within the range of from 0.01% by weight to 80% by weight, a sufficient function is achieved, and the dispersibility becomes good. The content is preferably within a range of from 0.1% by weight to 80% by weight, more preferably from 0.3% by weight to 70% by weight.

The respective proportions of the plural kinds of the functional substances used in the present invention are optional. However, the proportion of each functional substance used is at least 0.1% by weight, preferably at least 1% by weight based on the total weight of the functional substances.

The block polymer characteristically used in the present invention is also called a block copolymer and is a polymer wherein polymers having different segment structures are linearly bonded to each other by a covalent bond. The graft polymer used in the present invention is a polymer wherein another polymer is chemically boned in a branched form to a linear polymer that becomes a backbone.

The block polymer that is a component characteristically used in the present invention will hereinafter be described. Specific examples of block polymers usable in the present invention include acrylic or methacrylic block polymers, block polymers composed of polystyrene and any other addition polymerization system or condensation polymerization system, and block polymers having polyoxyethylene or polyoxyalkylene blocks. These heretofore known block polymers may be used. In the present invention, the block polymer is more preferably in a block form of AB, ABA, ABD or the like. A, B and D indicate block segments different from one another. The block polymer used in the present invention is preferably amphiphilic. As a specifically preferable form of the block polymer, there is preferably used an AB diblock polymer composed of a hydrophobic segment and a hydrophilic segment having an organic acid unit or a unit of an ionic salt thereof, or an ABC triblock polymer composed of a hydrophobic segment, a hydrophilic segment having an organic acid unit or a unit of an ionic salt thereof and a further segment. In the form of the ABC triblock polymer, a form wherein A is a hydrophobic segment, B is a nonionic hydrophilic segment, and C is a hydrophilic segment having an organic acid unit or a unit of an ionic salt thereof is preferably used from the viewpoint of stabilization of an included state.

In the present invention, the block polymer may be a graft polymer wherein another polymer is chemically boned in a branched form to a linear polymer that becomes a backbone. The respective segments of the block polymer may be copolymer segments. The form of the copolymer is not limited, but may be either a random segment or a graduation segment. In the present invention, a block polymer containing a polyalkenyl ether structure is preferably used. A block polymer having a polyvinyl ether structure is particularly preferably used. A great number of synthetic processes of the block polymer containing the polyalkenyl ether structure have been reported. A process by cationic living polymerization by Aoshima et al. (Journal of Polymer Bulletin, Vol. 15, p. 417, 1986; Japanese Patent Application Laid-Open No. 11-322942) is representative thereof. By conducting polymer synthesis by the cationic living polymerization, various polymers such as homopolymers, copolymers composed of two or more monomers, block polymers, graft polymers and graduation polymers can be synthesized with their chain lengths (molecular weights) exactly made uniform. In the polyalkenyl ether, various functional groups may be introduced in its side chains. Besides, the cationic polymerization may also be conducted in a $HI/I_2$ system, $HCl/SnCl_4$ system or the like.

The structure of the block polymer containing the polyalkenyl ether structure may be a copolymer composed of vinyl ether and another polymer.

The block polymer containing the polyvinyl ether structure preferably used preferably has a repeating unit structure represented by the following general formula (1).

General formula (1)

In the general formula (1), $R^1$ is selected from a linear, branched or cyclic alkyl group having 1 to 18 carbon atoms, $-(CH(R^2)-CH(R^3)-O)_l-R^4$ and $-(CH_2)_m-(O)_n-R^4$, in which l and m are, independently of each other, selected from integers of from 1 to 12, n is 0 or 1, $R^2$ and $R^3$ are, independently of each other, H or $-CH_3$, and $R^4$ is H, a linear, branched or cyclic alkyl group having 1 to 6 carbon atoms, Ph, Pyr, Ph-Ph, Ph-Pyr, $-CHO$, $-CH_2CHO$, $-CO-CH=CH_2$, $-CO-C(CH_3)=CH_2$ or $-CH_2COOR^5$, with the proviso that hydrogen bonded to carbon may be substituted by a linear or branched alkyl group having 1 to 4 carbon atoms, F, Cl or Br when $R^4$ is any other group than hydrogen, and carbon in the aromatic ring may be substituted by nitrogen, and $R^5$ is H or an alkyl group having 1 to 5 carbon atoms.

In the present invention, -Ph, -Pyr, -Ph-Ph and -Ph-Pyr denote phenyl, pyridyl, biphenyl and pyridylphenyl groups, respectively. With respect to the pyridyl, biphenyl and pyridylphenyl groups, they may be any possible position isomers.

In the present invention, an amphiphilic block polymer is preferably used. It can be obtained by, for example, conducting synthesis by selecting a hydrophobic block segment and a hydrophilic block segment from the repeating unit structures of the general formula (1).

Examples of the structure of a vinyl ether monomer as the repeating unit structure of the polyvinyl ether structure of the block polymer are mentioned below. However, the polyvinyl ether structures used in the present invention are not limited thereto.

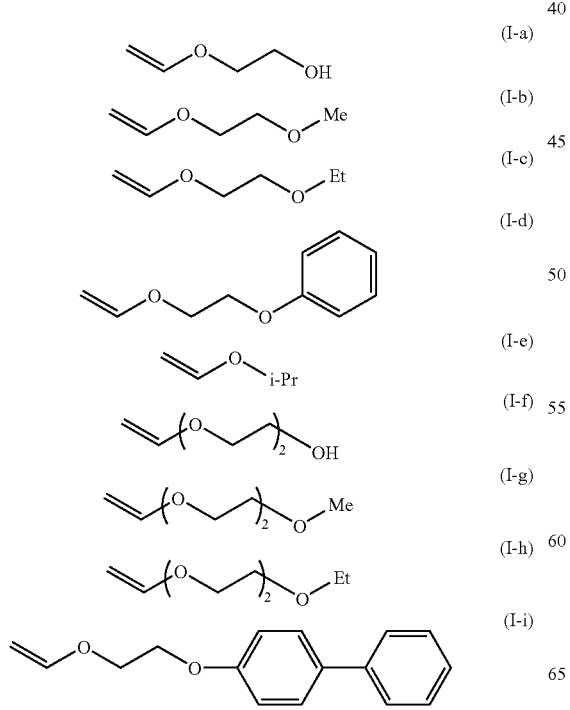

In the formulae, Me, Et and i-Pr denote methyl, ethyl and isopropyl groups, respectively.

Examples of the structure of the polyvinyl ether composed of each of these vinyl ether monomers are mentioned below. However, the polymers used in the present invention are not limited thereto.

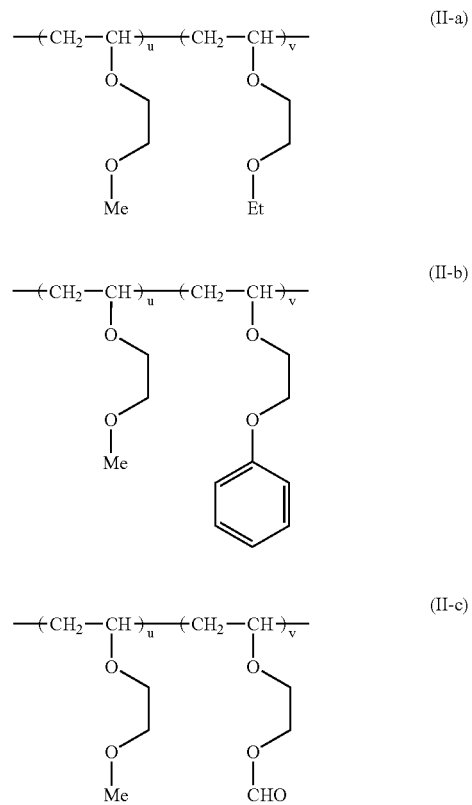

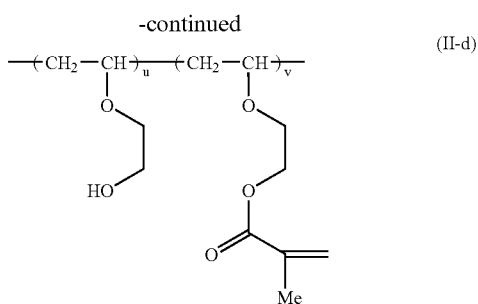

(II-d)

In the polyvinyl ether, the numbers u and v of repeating units are, independently of each other, preferably from 1 to 10,000, and the total (u+v) thereof is preferably from 10 to 20,000.

The molecular weight distribution Mw (weight average molecular weight)/Mn (number average molecular weight) of the block polymer used in the present invention is preferably at most 2.0, more preferably at most 1.6, still more preferably at most 1.3, still further preferably at most 1.2. The number average molecular weight (Mn) of the block polymer used the present invention is preferably within a range of from 1,000 to 300,000. When the number average molecular weight of the block polymer used in the present invention falls within the range of from 1,000 to 300,000, substances respectively exhibiting predetermined functions can be dispersed in a solvent with good results.

In order to improve dispersion stability and inclusion property, the molecular mobility of the block polymer is preferably more flexible because such a polymer becomes easy to physically entangle with the surfaces of the functional substances and have affinity for them. The block polymer is preferably flexible from the viewpoint of easy formation of a coating layer on a recording medium as described in detail below. Therefore, the glass transition temperature Tg of the main chain of the block polymer is preferably at most 20° C., more preferably at most 0° C., still more preferably at most −20° C. In this regard, the polymer having the polyvinyl ether structure is preferably used because it has a low glass transition temperature and flexible properties. Since coloring materials are preferably used as the functional substances in the present invention, an aromatic structure, preferably a phenyl or phenylene structure is preferably used in the hydrophobic segment in that dispersion stability can be improved with higher affinity for them. Further, in order to stabilize the included state, polymers at a core part, i.e., the hydrophobic segment portion preferably has a certain or still higher molecular weight, and it is at least 7,000, preferably at least 10,000, more preferably at least 12,000 in terms of number average molecular weight.

As the graft polymer contained in the structured material according to the present invention there may be used a polymer obtained by grafting an acrylic polymer on polyvinyl alcohol, a polymer obtained by grafting a polyvinyl ether polymer on an acrylic polymer or a polymer obtained by grafting polyester on a methacrylic polymer. A polymer in which a grafting polymer and a grafted polymer have the relation of hydrophobicity and hydrophilicity, i.e., an amphiphilic polymer is preferably used.

The content of the block polymer or graft polymer contained in the structured material according to the present invention is desirably from 0.1 to 90% by weight, preferably 0.5 to 80% by weight based on the total weight of the structured material. When the content of the polymer falls within the range of from 0.1 to 90% by weight, the functional substances contained in the structured material according to the present invention can be sufficiently dispersed or included, and the resulting composition comes to have a relatively low viscosity suitable for various kinds of functional materials.

The structured material according to the present invention has a feature that plural kinds of functional substances are included. The included state can be formed by, for example, dissolving coloring materials in an organic solvent insoluble in water in a micelle formed by the block polymer in water. Besides, it can be formed by forming an inclusion state by conducting phase inversion from a state that both polymer and coloring materials have been dissolved in an organic solvent into a hydrophilic solvent. It may also be formed by distilling off the remaining organic solvent in such a process. Further, for example, the formation may also be conducted by mixing a dispersion of pigments in a water-insoluble organic solvent with a micelle formed by the block polymer in water.

The structured material according to the present invention may be a micelle or reversed micelle formed by the presence of a solvent or the like as described above, or a structured material formed under such a condition that such a component is not present. The former is preferably used in the present invention.

The confirmation of the included state can be performed by various kinds of electron microscopes and/or instrumental analyses such as X-ray diffraction. The inclusion in a micelle state, the included state can be indirectly confirmed by separation of the coloring materials from the solvent under conditions of micelle collapse. As described above, the micelle state is preferably formed by the block polymer. Therefore, the block polymer used in the present invention is preferably amphiphilic.

The quantitative proportions of the functional substances and polymer included in the structured material can also be observed by various kinds of electron microscopes, instrumental analyses such as X-ray diffraction and/or coloring density analysis of the coloring materials, or by the indirect method described above.

The structured material according to the present invention is preferably in the form of particles. The particles preferably have an average particle diameter of at most 200 nm. When coloring materials are used as the functional substances, a composition having good tint can be realized when the particle diameter of the particles are small. When the functional substance dispersed composition according to the present invention is applied to an ink composition, the dispersion stability and tinting strength of a coloring-material-dispersed ink, and brightness of its color are greatly affected by a particle diameter of dispersed particles and uniformity of the particle diameter. In other words, when the particle diameter of the particles dispersed in the solvent is very great, aggregation occurs between the particles, and so stable dispersion may not be achieved in some cases. Since the particle diameter and tinting strength reside in an inversely proportional relation (Annalen der Physik, Vol. 25, p. 377, 1908), the tinting strength may be lowered if the particle diameter is too great. Therefore, the average particle diameter of the particles are preferably at most 200 nm, more preferably at most 150 nm, still more preferably at most 100 nm as described above.

The average particle diameter can be measured by various methods. Examples thereof include direct observation through an electron microscope, small angle neutron diffraction, small angle X-ray diffraction, light scattering method and laser diffraction. In order to measure a particle diameter of particles of a 200-nm or 100-nm level, the measurement can be preferably conducted by a dynamic light-scattering method. In the present invention, the particle diameter distribution of the particles can be measured by the dynamic light-scattering method that is a photon correlation method. As an index of the uniformity of the particle diameter, there is generally used an index of degree of dispersion indicated by Gulari et al. (The Journal of Chemical Physics, Vol. 70, p. 3965, 1979). The index of degree of dispersion is preferably at most 0.3, more preferably at most 0.2, still more preferably at most 0.1. The smaller the index of degree of dispersion, the narrower the particle diameter distribution. Particle diameter measuring apparatus by the dynamic light-scattering method include apparatus such as DLS7000 manufactured by Otsuka Electronics Co., Ltd.

In the structured material according to the present invention, in which the plurality of the functional substances different from each other are included in the block polymer or graft polymer, other polymers, and additives such as surfactants, antioxidants, ultraviolet absorbents and radical-trapping agents may be contained as other components. The functional substance dispersed composition according to the present invention will hereinafter be described.

The functional substance dispersed composition according to the present invention comprises the functional substance including structured material, and a solvent or dispersing medium.

The functional substance including structured material contained in the functional substance dispersed composition according to the present invention is the structured material as described above. The content of the structured material in the composition is preferably within a range of from 0.01 to 95% by weight, more preferably from 0.1 to 90% by weight based on the total weight of the composition.

The functional substance dispersed composition according to the present invention contains a solvent. No particular limitation is imposed on the solvent contained in the composition according to the present invention. The solvent means a medium in which components contained in the composition can be dissolved, suspended or dispersed. In the present invention, organic solvents such as various kinds of linear, branched and cyclic aliphatic hydrocarbons, aromatic hydrocarbons, and heterocyclic aromatic hydrocarbons, squeous solvents, and water may be used as the solvent. It goes without saying that a mixed solvent thereof may be used.

In the composition according to the present invention, water and hydrophilic solvents may be suitably used in particular.

Examples of the hydrophilic solvents include polyhydric alcohols such as ethylene glycol, diethylene glycol, triethylene glycol, polyethylene glycol, propylene glycol, polypropylene glycol and glycerol, polyhydric alcohol ethers such as ethylene glycol monomethyl ether, ethylene glycol monoethyl ether, ethylene glycol monobutyl ether, diethylene glycol monoethyl ether and diethylene glycol monobutyl ether, and nitrogen-containing solvents such as N-methyl-2-pyrrolidone, substituted pyrrolidone and triethanolamine. A monohydric alcohol such as methanol, ethanol or isopropanol may also be used. With respect to the pH of water, water may be used within all pH ranges. However, the pH is preferably within a range of from 1 to 14.

The content of the solvent in the composition according to the present invention is preferably within a range of from 0.1 to 99% by weight, and more preferably from 1 to 95% by weight based on the total weight of the composition.

The functional substance dispersed composition according to the present invention may also contain a dispersing medium. No particular limitation is imposed on the dispersing medium contained in the composition. The dispersing medium means a medium, in which components contained in the composition can be dispersed. In the present invention, various kinds of binder resins, or the like may be used as the dispersing medium in addition to the solvents described above. In particular, a binder resin may be suitably used in the composition according to the present invention.

The content of the dispersing medium in the composition according to the present invention is preferably within a range of from 0.1 to 99% by weight, and more preferably from 1 to 95% by weight based on the total weight of the composition. In the functional substance dispersed composition according to the present invention, additives such as other surfactants than those described above, ultraviolet absorbents, antioxidants, and organic substances such as various radical-trapping agents may also be contained.

The composition according to the present invention can be prepared by mixing the constituent components described above and uniformly dissolving or dispersing the resultant mixture.

The functional substance dispersed composition according to the present invention may be preferably used as an ink composition. As a preferred form thereof, there may be mentioned an ink-jet ink composition.

The ink composition according to the present invention will hereinafter be described.

The ink composition comprises the structured material, in which at least two functional substances selected from coloring materials of the same type or different type are included in the block polymer or graft polymer.

The content of the block polymer or graft polymer contained in the ink composition according to the present invention is within a range of from 0.1 to 90% by weight, preferably from 1% by weight to 80% by weight based on the total weight of the ink composition. In the case where the ink composition is used for an ink-jet printer, the content of the polymer used is preferably from 0.1% by weight to 30% by weight.

Other components than the block polymer of graft polymer contained in the ink composition according to the present invention will hereinafter be described in detail.

The other components include water, hydrophilic solvents, coloring materials, additives, etc. As described above, organic solvents may also be naturally used.

[Water]

As water contained in the composition according to the present invention, is preferred ion-exchanged water, purified water or ultrapure water, from which metal ions and the like are removed.

[Hydrophilic Solvent]

Examples of the hydrophilic solvents include polyhydric alcohols such as ethylene glycol, diethylene glycol, triethylene glycol, polyethylene glycol, propylene glycol, polypropylene glycol and glycerol, polyhydric alcohol ethers such as ethylene glycol monomethyl ether, ethylene glycol monoethyl ether, ethylene glycol monobutyl ether, diethylene glycol monoethyl ether and diethylene glycol monobutyl ether, and nitrogen-containing solvents such as N-methyl-2-pyrrolidone, substituted pyrrolidone and triethanolamine. In order to accelerate drying of the hydrophilic dispersion on a recording medium, a monohydric alcohol such as methanol, ethanol or isopropanol may also be used.

The content of water and the hydrophilic solvent in the ink composition according to the present invention is preferably within a range of from 20 to 99% by weight, and more preferably from 30 to 98% by weight based on the total weight of the ink composition.

[Coloring Material]

Coloring materials such as pigments and dyes are contained in the ink composition according to the present invention. Pigments are preferably used.

The pigments may be either organic pigments or inorganic pigments. As pigments used in inks, may be used a black pigment and pigments of three primary colors of cyan, magenta and yellow. Incidentally, other color pigments than those described above, colorless or light-colored pigments and metalescent pigments may also be used. In addition, pigments newly synthesized for the present invention may also be used.

Pigments self-dispersible in water may also be used in the composition according to the present invention. The pigments dispersible in water include those making good use of steric hindrance by adsorbing a polymer on the surface of a pigment and those making good use of electrostatic repulsion force. Examples of commercially available self-dispersing pigments include CAB-O-JET200 and CAB-O-JET300 (both, trade names; products of Cabot Company), and Microjet Black CW-1 (trade name; product of Orient Chemical Industries Ltd.).

When the pigments are used in the ink composition according to the present invention, the amount thereof is preferably from 0.1 to 50% by weight based on the total weight of the ink composition. When the amount of the pigments falls within a range of from 0.1 to 50% by weight, sufficient image density is achieved, and the fixing ability of an image formed becomes good. It is hence preferably to use the pigments in such a range. A more preferable range of the amount is from 0.5% by weight to 30% by weight.

In the ink composition according to the present invention, dyes may also be used in place of the pigments or in combination with the pigments. Water-soluble dyes such as direct dyes, acid dyes, basic dyes, reactive dyes and food dyes, and insoluble coloring matter such as oil-soluble dyes and disperse dyes may be used.

When the dyes are used in the ink composition according to the present invention, the amount thereof is preferably from 0.1 to 50% by weight based on the total weight of the ink composition. In the ink composition according to the present invention, is used the structured material, in which the plural kinds of coloring materials are included in the block polymer or graft polymer. By including the plural kinds of coloring materials in the polymer, the dispersibility and functionality of the respective coloring materials different in nature can be stabilized. In the structured material, in which at least two coloring materials are included, the tint can be controlled while realizing excellent dispersion stability by using the plural kinds of coloring materials.

The content of the structured material in the ink composition according to the present invention is preferably within a range of from 0.1 to 70% by weight, and more preferably from 1 to 50% by weight based on the total weight of the ink composition.

[Additive]

To the ink composition according to the present invention, various additives and auxiliary agents may be added as needed. An example of the additives includes a dispersion stabilizer, by which a pigment is stably dispersed in a solvent. If dispersion is insufficient, any other dispersion stabilizer may also be added.

As other dispersion stabilizers, there may be used resins or surfactants having both hydrophilic portion and hydrophobic portion. Examples of the resin having both hydrophilic portion and hydrophobic having portion include copolymers of a hydrophilic monomer and a hydrophobic monomer.

Examples of the hydrophilic monomer include acrylic acid, methacrylic acid, maleic acid, fumaric acid, monoesters of the carboxylic acids described above, vinylsulfonic acid, styrenesulfonic acid, vinyl alcohol, acrylamide and methacryloxyethyl phosphate. Examples of the hydrophobic monomer include styrene, styrene derivatives such as α-methylstyrene, vinylcyclohexane, vinylnaphthalene derivatives, acrylic acid esters and methacrylic acid esters. The copolymer may be in any form of random, block and graft copolymers. It goes without saying that both hydrophilic monomer and hydrophobic monomer are not limited to those described above.

As the surfactants, there may be used anionic, nonionic, cationic and amphoteric surfactants. Examples of the anionic surfactants include fatty acid salts, alkylsulfate salts, alkylarylsulfonic acid salts, alkyl diaryl ether disulfonic acid salts dialkylsulfosuccinic acid salts, alkylphosphonic acid salts, naphthalenesulfonic acid-formalin condensates, polyoxyethylene alkyl phosphate salts and glycerol borate fatty acid esters.

Examples of the nonionic surfactants include polyoxyethylene alkyl ethers, polyoxyethylene-oxypropylene block copolymers, sorbitan fatty acid esters, glycerol fatty acid esters, polyoxyethylene fatty acid esters, polyoxyethylene alkylamines, fluorine-containing surfactants and silicon-containing surfactants.

Examples of the cationic surfactants include alkylamine salts, quaternary ammonium salts, alkylpyridinium salts and alkylimidazolium salts. Examples of the amphoteric surfactants include alkylbetaines, alkylamine oxides and phosphatidylcholine.

The surfactants are also not limited to those described above.

To the composition according to the present invention, there may be added a hydrophilic solvent as needed. When the composition is used as an ink for ink-jet in particular, the hydrophilic solvent is used for the purpose of preventing drying of the ink at a nozzle part and solidification of the ink. Water alone or a mixture of water and another hydrophilic solvent may be used. As the hydrophilic solvent, those mentioned above may be used as they are. The content of the hydrophilic solvent is within a range of from 0.1 to 60% by weight, preferably from 1 to 25% by weight based on the total weight of the ink composition.

When the composition is used as, for example, an ink, pH adjustors for achieving stabilization of the ink and stability of the ink to piping in a recording apparatus, penetrants for accelerating penetration of the ink into a recording medium to facilitate apparent drying, mildewproofing agents for preventing occurrence of mildew in the ink, chelating agents for blocking metal ions in the ink to prevent deposition of metals at a nozzle part and deposition of insoluble matter in the ink, antifoaming agents for preventing occurrence of foam upon circulation, transferring or preparation of a recording liquid, and besides, antioxidants, viscosity modifiers, conductivity-imparting agents, and ultraviolet absorbents may also be added as other additives. Other components than those described above may be contained in the ink composition according to the present invention.

The ink composition according to the present invention can be prepared by mixing the constituent components described above and uniformly dissolving or dispersing the resultant mixture. For example, a plurality of the constituent components are uniformly mixed in a common solvent, the resultant mixture is inversed into a water phase or non-aqueous phase, the phase-inversed mixture is dispersed by means of a sand mill, ball mill, homogenizer, nanomizer or the like to prepare an ink mother liquor, and a solvent and additives are added to this liquor to adjust its physical properties, thereby preparing the ink composition.

A preferred embodiment of the ink composition according to the present invention is an ink-jet ink, more preferably an ink corresponding to an On-Demand type ink-jet. Examples of the On-Demand type ink-jet include thermal and piezo systems. In any case, inks having a low viscosity are required. The typical viscosity is at most 10 cp. According to the ink composition that is a preferred embodiment of the present invention, the structured material, in which the coloring materials are included in the amphiphilic block polymer, is dispersed, so that a dispersed state low in viscosity can be realized. The molecular weight distribution of the block polymer is preferably made small from the viewpoint of forming uniform micelles.

The average particle diameter of particles composed of the coloring-material-including block polymer is preferably at most 200 nm. When the average particle diameter is at most 200 nm, good color expression can be realized because coloring ability is improved, and light scattering by visible light can be inhibited.

[Liquid-Ejecting Apparatus]

The liquid-ejecting apparatus according to the present invention comprises a liquid-ejecting means for ejecting the composition by causing energy for ejection to act on the composition, thereby forming a pattern, and a driving means for driving the liquid-ejecting means.

A preferred embodiment as a method for forming a pattern using the composition is a pattern forming process by an ink-jet method. A preferred embodiment of the present invention is an image forming process comprising the step of forming an image using the ink. The ink according to the present invention can be used in image forming apparatus by means of various ink-jet methods. Drawing can be made by an image forming process using this apparatus. The ink-jet method used may be a well known method such as a piezo ink-jet system using a piezoelectric element or a bubble-jet system that thermal energy is applied to an ink to cause film boiling to eject the ink, thereby conducting recording. Any type of a continuous type and an On-Demand type may be used. The ink composition according to the present invention may also be used in a recording system that printing is conducted on an intermediate transfer medium with an ink, and an image formed is then transferred to a final recording medium such as paper.

A pattern of an electron circuit or device may also be formed by the pattern forming process according to the present invention.

A preferred embodiment as a pattern forming apparatus using the pattern forming process is an ink-jet recording apparatus using the ink composition. This apparatus includes an ink-jet recording apparatus of the piezo ink-jet system using a piezoelectric element, the bubble-jet system wherein thermal energy is applied to an ink to cause film boiling to eject the ink, thereby conducting recording, or the like.

FIG. 1 illustrates a schematic mechanism of an ink-jet recording apparatus according to the present invention. Reference numeral 50 indicates a central processing unit (CPU) of the ink-jet recording apparatus 20. A program for controlling the CPU 50 may be stored in a program memory 66 or may also be stored in a memory means such as EEPROM (not illustrated) as the so-called firmware. According to the ink-jet recording apparatus, recording data from a recording data-preparing means (not illustrated, computer or the like) is received by the program memory 66. The recording data may be information itself of images or characters to be recorded, compressed information thereof or encoded information. When the compressed or encoded information is processed, expansion or development can be conducted by the CPU 50 to obtain the information of the images or characters to be recorded. An X-encoder 62 (for example, relating to an X-direction or main scanning direction) and a Y-encoder 64 (for example, relating to a Y-direction or secondary scanning direction) are provided, whereby a relative position of a head to a recording medium can be notified to the CPU 50.

The CPU 50 sends signals for recording the images to an X-motor drive-circuit 52, a Y-motor drive circuit 54 and a head drive circuit 60 on the basis of the information of the program memory 66, X-encoder 62 and Y-encoder 64. The X-motor drive circuit 52 and Y-motor drive circuit 54 drive an X-direction drive motor 56 and a Y-direction drive motor 58, respectively, to move a head 70 relatively to the recording medium and to a recording position. The head drive circuit 60 sends signals for conducting ejection of the respective ink compositions (Y, M, C and K) and a stimulus-imparting substance, which becomes stimuli, to the head 70 at the time the head 70 has been moved to the recording position, thereby conducting recording. The head 70 may be a head for ejecting a single ink composition or a head for ejecting plural kinds of ink compositions. The head 70 may have a function for ejecting the stimulus-imparting substance, which becomes stimuli, in combination.

[Head Kit]

An ink-jet head kit having an ink-jet head for ejecting the ink composition according to the present invention will be described.

Figure 2:
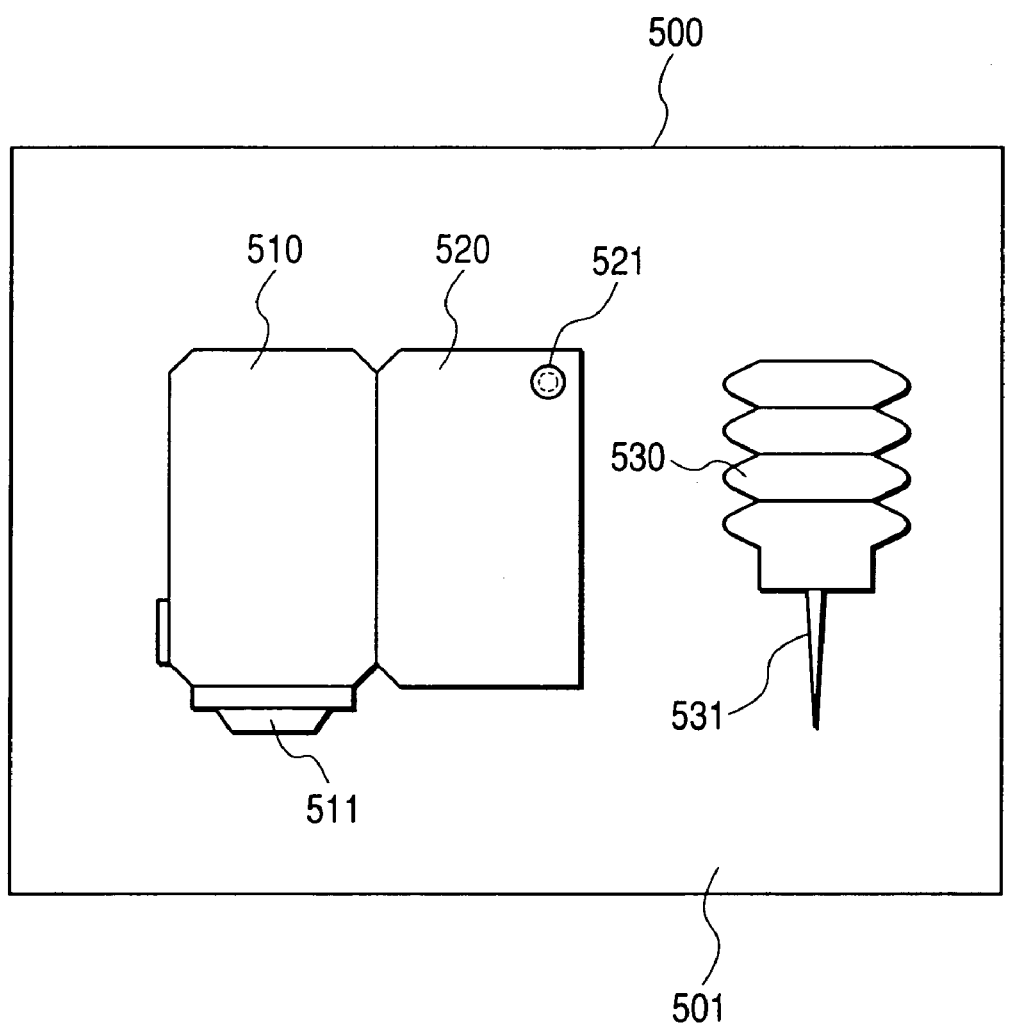
FIG. 2 typically illustrates an ink-jet head kit according to the present invention.

FIG. 2 typically illustrates the ink-jet head kit 500 according to the present invention. The ink-jet head kit comprises a kit container 501, and an ink-jet head 510 having an ink-ejecting part 511 for ejecting an ink, an ink container 520 that is a liquid container inseparable or separable from the head 510, and an ink charging means 530 holding an ink for charging the ink container, which are contained in the kit container 501.

When the ink has been consumed, it is only necessary to insert a part of an insertion part 531 (injector needle or the like) of the ink charging means 530 into an air-communicating port 521 of the ink container, or a hole formed in a joint to the ink-jet head or a wall of the ink container so as to charge the ink container with the ink within the ink charging means 530 through the insertion part. The ink-jet head, ink container, ink charging means and the like are contained in a kit container as described above, whereby the ink can be put immediately and easily into the ink container as described above even when the ink has been consumed, so as to rapidly start recording.

Incidentally, description has been given to the ink-jet head kit containing the ink charging means. However, the ink-jet head kit according to the present invention may be in such a form that no ink charging means is provided, but a separable type ink container, which has been charged with ink, and a head are contained in a kit container 510.

Although only the ink charging means for charging the ink container with ink is illustrated in FIG. 2, the ink-jet head kit may be in such a form that a foaming liquid charging means for charging a foaming liquid container with a foaming liquid is contained in addition to the ink charging means in the kit container.

The present invention will hereinafter be described in detail by the following examples. However, the present invention is not limited to these examples.

EXAMPLE 1

<Synthesis of Block Polymers>

Synthesis of an AB block polymer, terminated by a carboxylic acid at one end, composed of isobutyl vinyl ether (IBVE), 2-methoxyethyl vinyl ether (MOVE) and $HO(CH_2)_5COOH$.

A poly[IBVE-b-MOVE] —$O(CH_2)_5COOH$ (here, b is a symbol indicating a block polymer) was synthesized in accordance with the following procedure. After the interior of a glass container equipped with a three-way stop-cock was purged with nitrogen, the container was heated to 250° C. under a nitrogen gas atmosphere to remove adsorbed water. After the system was returned to room temperature, 12 mmol of IBVE (component A), 16 mmol of ethyl acetate, 0.1 mmol of 1-isobutoxyethyl acetate and 11 ml of toluene were added to cool the reaction system. At the time the temperature within the system had reached 0° C., 0.2 mmol of ethylaluminum sesquichloride (equimolar mixture of diethylaluminum chloride and ethylaluminum dichloride) was added to initiate polymerization. The molecular weight was monitored with a time-division interval by means of gel permeation chromatography (GPC) to confirm completion of the polymerization of the component A.

Then, 12 mmol of a component B (MOVE) was added to conduct polymerization. After completion of the polymerization of the component B was confirmed by monitoring by means of GPC, 30 mmol of $HO(CH_2)_5COOEt$ was added to terminate the polymerization reaction. The reaction mixture solution was diluted with dichloromethane and washed three times with 0.6 M hydrochloric acid and then three times with distilled water. The resultant organic phase was concentrated and dried to solids by an evaporator to obtain a block polymer of poly[IBVE-b-MOVE] —$O(CH_2)_5COOEt$.

The identification of the compound synthesized was conducted by means of GPC and NMR. The identification of a portion bonded to a terminal was conducted by confirming the presence of a terminal site in a spectrum of the high-molecular weight compound by measurement by means of the DOSY method of NMR. Mn was $2.2 \times 10^4$, and Mw/Mn was 1.2. Mn denotes a number average molecular weight, and Mw indicates a weight average molecular weight. The ester portion at the terminal of the poly[IBVE-b-MOVE] —$O(CH_2)_5COOEt$ thus obtained was hydrolyzed, and the resultant product was identified by NMR. As a result, it was found that the intended poly[IBVE-b-MOVE]-$O(CH_2)_5$COOH was obtained.

Twenty-six parts by weight of the carboxylic acid-terminated block polymer was stirred together with 200 parts by weight of an aqueous solution of sodium hydroxide having a pH of 10 at 0° C. for 3 days to prepare a solution of a sodium salt of the carboxylic-acid-containing polymer, in which the polymer had been completely dissolved. The polymer was extracted from methylene chloride, the extract was dried, and the solvent was distilled off to isolate the polymer.

Twenty-five parts by weight of this polymer, 5 parts by weight of a fat-soluble dye, Oil Blue N (trade name, product of Aldrich Co.) and 5 parts by weight of a fat-soluble dye, Valifast Yellow (trade name, product of Orient Chemical Industries Ltd.) were dissolved in 50 parts by weight of THF, and the resultant solution was then added dropwise to 800 parts by weight of distilled water with stirring. Fifty parts by weight of ethylene glycol was additionally added. The resultant mixture was left to stand at 40° C. for 3 hours in an open condition from this state, and THF was completely distilled off to prepare a green ink composition (1) according to this example. The particle diameter of the ink composition was measured by means of a particle diameter measuring apparatus, DLS7000 (trade name; manufactured by Otsuka Electronics Co., Ltd.). As a result, the average particle diameter was 96 nm, and the index of degree of dispersion was 0.089.

EXAMPLE 2

The ink prepared in EXAMPLE 1 was put in an ink tank of a BJ Printer S530 (trade name, manufactured by Canon Inc.) to conduct recording on plain paper. As a result, green characters were printed beautifully.

EXAMPLE 3

A green ink composition (2) was prepared in the same manner as in EXAMPLE 1 except that the component A of the block polymer used in EXAMPLE 1 was changed to 2-ethoxyethyl vinyl ether. The polymer of 2-ethoxyethyl vinyl ether that is the component A was changed from that of hydrophobicity to hydrophilicity at a temperature not higher than 20° C., and the micelle was collapsed at the time the polymer became hydrophilic. The ink composition (2) was cooled to 0° C. to collapse the micelle. As a result, the coloring materials were dissolved out and surfaced on an upper part of the ink. The water phase was completely decolored. By this fact, it was confirmed that the coloring materials were completely included in the block polymer micelle. With respect to the coloring material concentration-ratio of the ink composition (2) to the decolored water phase in terms of an intensity ratio at $\lambda_{max}$, the latter was 0.4% of the former, so that it was found that at least 99% of the coloring materials were included.

COMPARATIVE EXAMPLE 1

The two fat-soluble dyes used in EXAMPLE 1 were dissolved in methylene chloride, the resultant solution was applied on plain paper by a brush. The plain paper was left to stand for 30 hours under an environment containing 10 ppm of ozone. Change in OD was compared with the recording medium in EXAMPLE 2 by means of a particle diameter measuring apparatus RD-19 (trade name, manufactured by Sakata Ink K.K.). As a result, the reduction rate was 3 times as much as EXAMPLE 2.

EXAMPLE 4

Ten parts by weight of the polymer prepared in EXAMPLE 1, 3 parts by weight of a fat-soluble dye, Oil Yellow (trade name, product of Orient Chemical Industries Ltd.) and 4 parts by weight of a fat-soluble dye of the same hue, Valifast Yellow (trade name, product of Orient Chemical Industries Ltd.) were dissolved in 50 parts by weight of THF, and the resultant solution was then added dropwise to 700 parts by weight of distilled water with stirring. Fifty parts by weight of ethylene glycol was additionally added. The resultant mixture was left to stand at 40° C. for 3 hours in an open condition from this state, and THF was completely distilled off to prepare an ink composition with particles uniformly dispersed without deposits.

The particle diameter of the ink composition was measured by means of a dynamic light-scattering measuring apparatus, DLS7000 (trade name; manufactured by Otsuka Electronics Co., Ltd.). As a result, the average particle diameter was 98 nm, and the index of degree of dispersion was 0.097. Even when the ink composition was left to stand at room temperature for 2 months, no deposit was observed, and the dispersion was stable. The ink was put in an ink tank of a BJ Printer S530 (trade name, manufactured by Canon Inc.) to conduct recording on plain paper. As a result, characters were printed beautifully.

COMPARATIVE EXAMPLE 2

Ten parts by weight of sodium polyacrylate (number average molecular weight Mn: 6,000), 3 parts by weight of a fat-soluble dye, Oil Yellow (trade name, product of Orient Chemical Industries Ltd.) and 4 parts by weight of a fat-soluble dye of the same hue, Valifast Yellow (trade name, product of Orient Chemical Industries Ltd.) were dissolved in 50 parts by weight of THF, and the resultant solution was then added dropwise to 700 parts by weight of distilled water with stirring. Fifty parts by weight of ethylene glycol was additionally added. The resultant mixture was left to stand at 40° C. for 3 hours in an open condition from this state, and THF was completely distilled off to prepare an ink composition. As a result, a comparative amount of deposit was observed. Therefore, coarse particles were removed by a membrane filter having a pore size of 2 μm to prepare an ink composition. When the ink composition was left to stand at room temperature for 1 month, yellow deposits were observed.

COMPARATIVE EXAMPLE 3

Ten parts by weight of a block polymer (polymerization ratio: styrene/acrylic acid=6/4; Mn: 12,000) of styrene and sodium acrylate and 7 parts by weight of a fat-soluble dye, Oil Yellow (trade name, product of Orient Chemical Industries Ltd.) were dissolved in 50 parts by weight of THF, and the resultant solution was then added dropwise to 700 parts by weight of distilled water with stirring. Fifty parts by weight of ethylene glycol was additionally added. Coarse particles were removed by a membrane filter having a pore size of 2 μm to prepare an ink composition. When the ink composition was left to stand at room temperature for 1 month, yellow deposits were observed.

EXAMPLE 5

A polymer using 2-(4-methylphenyl)ethyl vinyl ether as a segment A, 2-(2-methoxyethyloxy)ethyl vinyl ether as a segment B and ethyl 4-(2-vinyloxy)ethoxybenzoate as a segment C having a copolymerization ratio A/B/C of 90/80/14 was synthesized in the same manner as in EXAMPLE 1. The number average molecular weight of a polymer of the component A alone was 12,700, and Mw/Mn was 1.09. The number average molecular weight of the ABC block polymer was 24,400, and Mw/Mn was 1.31. As with EXAMPLE 4, 10 parts by weight of this polymer, 5 parts by weight of a fat-soluble dye, Oil Yellow (trade name, product of Orient Chemical Industries Ltd.) and 4 parts by weight of a fat-soluble dye of the same hue, Valifast Yellow (trade name, product of Orient Chemical Industries Ltd.) were dissolved in 50 parts by weight of THF, and the resultant solution was then added dropwise to 700 parts by weight of distilled water with stirring. Fifty parts by weight of ethylene glycol was additionally added. The resultant mixture was left to stand at 40° C. for 3 hours in an open condition from this state, and THF was completely distilled off to prepare an ink composition with particles uniformly dispersed without deposits.

The particle diameter of the ink composition was measured by means of a dynamic light-scattering measuring apparatus, DLS7000 (trade name; manufactured by Otsuka Electronics Co., Ltd.). As a result, the average particle diameter was 61 nm, and the index of degree of dispersion was 0.074. Even when the ink composition was left to stand at room temperature for 2 months, no deposit was observed, and the dispersion was stable. The ink was put in an ink tank of a BJ Printer S530 (trade name, manufactured by Canon Inc.) to conduct recording on plain paper. As a result, characters were printed beautifully.

EXAMPLE 6

An investigation was made in the same manner as in EXAMPLE 5 using the polymer prepared in EXAMPLE 5 except that 5.parts by weight of Pigment Yellow 128 was used in place of 5 parts by weight of the fat-soluble dye, Oil Yellow (trade name, product of Orient Chemical Industries Ltd.). In this case, an ink composition with particles uniformly dispersed without deposits was obtained. The particle diameter of the ink composition was measured by means of a dynamic light-scattering measuring apparatus, DLS7000 (trade name; manufactured by Otsuka Electronics Co., Ltd.). As a result, the average particle diameter was 126 nm, and the index of degree of dispersion was 0.082. Even when the ink composition was left to stand at room temperature for 2 months, no deposit was observed, and the dispersion was stable. The ink was put in an ink tank of a BJ Printer S530 (trade name, manufactured by Canon Inc.) to conduct recording on plain paper. As a result, characters were printed beautifully.

EXAMPLE 7

An investigation was made in the same manner as in EXAMPLE 5 using the polymer prepared in EXAMPLE 5 except that 3.5 parts by weight of carbon black, MOGUL L (product of Cabot Company) was used in place of 5 parts by weight of the fat-soluble dye, Oil Yellow (trade name, product of Orient Chemical Industries Ltd.), and 1.5 parts by weight of an black fat-soluble dye, Oil Black HBB (trade name, product of Orient Chemical Industries Ltd.) was used in place of 4 parts by weight of the fat-soluble dye, Valifast Yellow (trade name, product of Orient Chemical Industries Ltd.). In this case, an ink composition with particles uniformly dispersed without deposits was obtained. The particle diameter of the ink composition was measured by means of a dynamic light-scattering measuring apparatus, DLS7000 (trade name; manufactured by Otsuka Electronics Co., Ltd.). As a result, the average particle diameter was 132 nm, and the index of degree of dispersion was 0.099. Even when the ink composition was left to stand at room temperature for 3 months, no deposit was observed, and the dispersion was stable. The ink was put in an ink tank of a BJ Printer S530 (trade name, manufactured by Canon Inc.) to conduct recording on plain paper. As a result, characters were printed beautifully.

COMPARATIVE EXAMPLE 4

An ink composition was prepared in the same manner as in EXAMPLE 7 except that the black fat-soluble dye, Oil Black HBB (trade name, product of Orient Chemical Industries Ltd.) used in the preparation of the ink composition in EXAMPLE 7 was not used. When this ink was left to stand at room temperature for 3 months, it was observed that the pigment was slightly precipitated on the bottom of a sample bottle.

Since the functional substance including structured material according to the present invention has a plurality of functional substances different from each other included in a polymer, its dispersion stability is good, and the composition containing the structured material and a solvent inhibits aggregation by interaction between particles, has stable dispersibility in the solvent and can be utilized as an ink composition having good coloring ability and fixing ability. The ink composition can be stably applied from an ink-applying apparatus to conduct printing on a recording medium, and can be utilized as an ink composition for the ink-applying apparatus.

This application claims priority from Japanese Patent Application Nos. 2003-286926 filed Aug. 5, 2003 and 2004-216363 filed Jul. 23, 2004, which are hereby incorporated by reference herein.

The invention claimed is:

1. A structured material including two or more mutually different oil-soluble dyes, the two or more mutually different oil-soluble dyes being included in a micelle formed from a block polymer having a repeating unit structure represented by the following general formula (1):

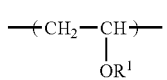

General formula (1)

where $R^1$ is selected from a linear, a branched or cylic alkyl group having 1 to 18 carbon atoms, —(CH($R^2$))—CH($R^3$)—O)$_l$—$R^4$ and —(CH$_2$)$_m$—(O)$_n$—$R^4$, in which l and m are, independently of each other, selected from integers of from 1 to 12, n is 0 or 1, $R^2$ and $R^3$ are, independently of each other, H or —CH$_3$, and $R^4$ is H, a linear, branched, or cyclic alkyl group having 1 to 6 carbon atoms, Ph, Pyr, Ph-Ph, Ph-Pyr, —CHO, —CH$_2$CHO, —CO—CH=CH$_2$, —CO—C(CH$_3$)=CH$_2$, or —CH$_2$COOR$^5$, with proviso that hydrogen bonded to carbon may be substituted by a linear or branched alkyl group having 1 to 4 carbon atoms, F, Cl, or Br when $R^4$ is any other group than hydrogen, and carbon in the aromatic ring may be substituted by nitrogen, and $R^5$ is H or an alkyl group having 1 to 5 carbon atoms.

2. The structured material according to claim 1, wherein the structured material is in the form of particles, and the average particle diameter of the particles is at most 200 nm.

3. A functional-substance-dispersed composition comprising the structured material including two or more mutually different oil-soluble dyes according to claim 1, and a solvent or dispersing medium.

4. A liquid-applying process comprising the step of applying the functional-substance-dispersed composition according to claim 3 to a medium.

5. A liquid-applying apparatus comprising a liquid-applying means for applying the functional-substance-dispersed composition according to claim 3 by causing energy for application to act on the composition, and a driving means for driving the liquid-applying means.

* * * * *